(12) United States Patent
Stoddard

(10) Patent No.: US 7,837,063 B2
(45) Date of Patent: Nov. 23, 2010

(54) DISPENSING MEASURING DEVICE

(76) Inventor: Bryan Stoddard, 9970 Cambridge Acres, Holly, MI (US) 48442

( * ) Notice: Subject to any disclaimer, the term of this patent is extended or adjusted under 35 U.S.C. 154(b) by 812 days.

(21) Appl. No.: 11/517,002

(22) Filed: Sep. 7, 2006

(65) Prior Publication Data

US 2008/0078785 A1    Apr. 3, 2008

(51) Int. Cl.
*G04C 1/12*    (2006.01)
(52) U.S. Cl. .............................. 222/14; 222/55; 222/59; 222/71; 222/641; 239/68; 239/70
(58) Field of Classification Search ............. 222/14–22, 222/23, 25, 28, 52, 55, 59–60, 71–73, 638–641, 222/40, 189.06, 189.11; 141/128; 239/67–70; 4/546, 559, 638, 654, 668
See application file for complete search history.

(56) References Cited

U.S. PATENT DOCUMENTS

| 3,987,715 | A | | 10/1976 | Muller | |
|---|---|---|---|---|---|
| 4,111,243 | A | * | 9/1978 | Fetterman | 141/102 |
| 4,310,021 | A | * | 1/1982 | Hauser | 137/624.2 |
| 4,720,024 | A | | 1/1988 | Jongerius | |
| 4,744,895 | A | * | 5/1988 | Gales et al. | 210/96.2 |
| 4,880,535 | A | * | 11/1989 | Burrows | 210/181 |
| 4,934,565 | A | * | 6/1990 | Heisey et al. | 222/22 |
| 5,040,106 | A | * | 8/1991 | Maag | 700/56 |
| 5,207,148 | A | * | 5/1993 | Anderson et al. | 99/281 |
| 5,233,860 | A | | 8/1993 | Mori et al. | |
| 5,454,406 | A | * | 10/1995 | Rejret et al. | 141/1 |
| 5,720,414 | A | * | 2/1998 | Adams | 222/1 |
| 5,730,323 | A | * | 3/1998 | Osborne | 222/55 |
| 5,867,403 | A | * | 2/1999 | Sasnett et al. | 700/282 |
| 5,957,339 | A | * | 9/1999 | Deni et al. | 222/190 |
| 6,053,092 | A | * | 4/2000 | Anderson | 99/275 |
| 6,131,768 | A | * | 10/2000 | Taivalkoski et al. | 222/14 |
| 6,327,869 | B1 | | 12/2001 | Shapiro et al. | |
| 6,336,363 | B1 | | 1/2002 | Fehr | |
| 6,367,568 | B2 | * | 4/2002 | Steinke et al. | 175/331 |
| 6,367,658 | B1 | * | 4/2002 | Kenney et al. | 222/14 |
| 6,640,847 | B2 | | 11/2003 | Verhoeven | |
| 6,871,675 | B1 | * | 3/2005 | Marszalec et al. | 141/82 |
| 7,036,535 | B1 | | 5/2006 | Chandler | |
| 2004/0124216 | A1 | * | 7/2004 | Payne et al. | 222/400.7 |

FOREIGN PATENT DOCUMENTS

GB    2140389 A2 * 11/1984

* cited by examiner

*Primary Examiner*—Kevin P Shaver
*Assistant Examiner*—Andrew Bainbridge
(74) *Attorney, Agent, or Firm*—Warn Partners, P.C.; Ronald P. Bender

(57) ABSTRACT

A water dispensing device that is so small it fits on a kitchen countertop that provides very accurate measurements of water by using a pressure regulator on water coming in from a typical kitchen water faucet and then using a timer in order to better control the amount of fluid dispensed. In an alternative embodiment, the timer is eliminated and replaced with a flowmeter. The water dispensing device has an interactive panel to allow a user to input how much water to dispense, or to pre-set the device to dispense a specific amount of water at a specific time of day. It is contemplated that this system would be a convenient way to accurately dispense the exact amount of water to fill a particular user's favorite coffee mug, or to assist a small volume baker in quickly and accurately getting just the right of water for a baking recipe, where accuracy is critical.

2 Claims, 3 Drawing Sheets

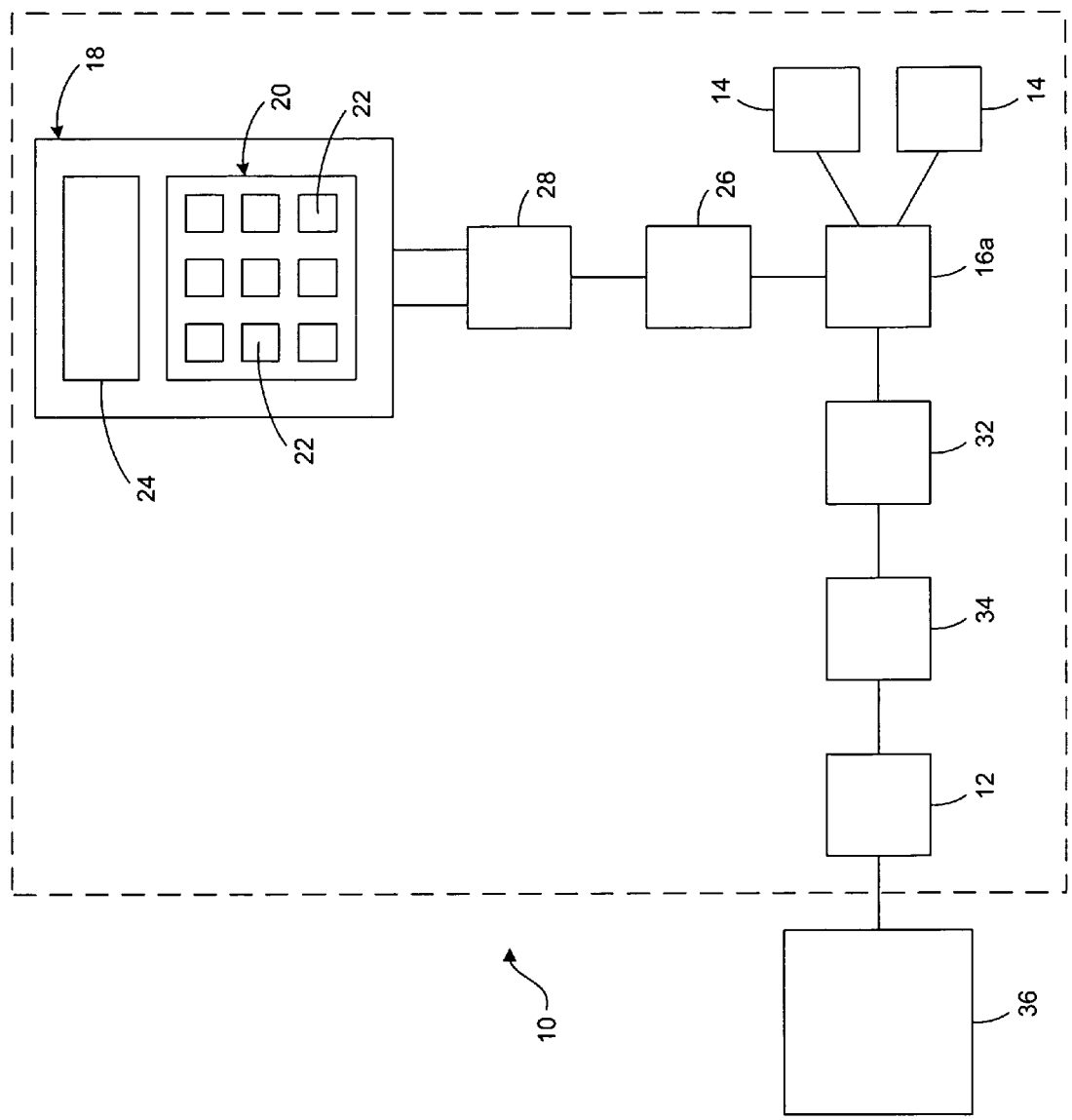

DISPENSING MEASURING DEVICE

FIELD OF THE INVENTION

The present invention relates to a measuring device for measuring the amount of fluid being dispensed from an outlet.

BACKGROUND OF THE INVENTION

At times it is desirable to accurately determine an amount of fluid being dispensed from an outlet or the flow rate of the fluid. However, it can be difficult to accurately measure an amount of fluid flowing from a source. For example, when a person is using a measuring cup, it can be difficult to accurately measure the amount of desired fluid, such as water. A person has to adjust the faucet to a desired flow rate, fill the measuring cup, set it on a flat surface, and determine the amount of water in the measuring cup. It can be time consuming and inefficient to continue the above steps until a desired amount of water is accurately measured.

Similarly, it can be difficult to measure the amount of fluid required when the units used to measure the fluid are different then the units for the known amount of fluid. For example, if directions reference cups and a person only has a measuring device for fluid ounces and, if the person does not have the knowledge of the cups to fluid ounces conversion they must determine the equation for converting and then convert the units before being able to measure the desired amount of fluid. The above example, is intensified if one has to convert from English units to Metric units or any other measuring unit.

Further, it can be difficult to determine the amount of fluid needed when one wishes to multiple the amount of known fluid needed. For example, if the recipe requires one amount of fluid, but a person is making a triple batch of the recipe, then the person must multiply the amount or separately measure the single amount out how ever many times it is being multiplied. Likewise, one may be required to divide the required amount if only a portion of the batch is being made.

Therefore, it is desirable to develop a measuring device which is interactive, so that a predetermined amount of fluid can be determined based upon an input, and the measuring device can accurately dispense the desired amount of fluid.

SUMMARY OF THE INVENTION

One embodiment of the present invention relates to a measuring device providing at least one inlet, at least one outlet, at least one valve, and at least one interactive panel. The inlet and the outlet are in fluid communication with one another. The valve is in fluid communication between the inlet and the outlet. The interactive panel is interfaced with the valve in order for a predetermined amount of fluid to be dispensed from the outlet.

Another embodiment of the present invention relates to a measuring device providing at least one inlet, at least one outlet, at least one valve, an actuator, an interactive panel, and a key pad. The inlet and the outlet are in fluid communication with one another. The valve is in fluid communication between the inlet and the outlet. The actuator is operably connected to the valve. The interactive panel is interfaced with the actuator. The key pad is at least a portion of the interactive panel so that a value is entered into the interactive panel by the key pad in order for a predetermined amount of fluid to be dispensed from the at least one outlet.

Another embodiment of the present invention relates to a measuring device providing at least one inlet, at least one outlet, at least one valve, an actuator, a timer, at least one interactive panel, a key pad, and a pressure regulator. The inlet and outlet are in fluid communication with one another. The valve is in fluid communication between the inlet and the outlet. The actuator is operably connected to the valve. The interactive panel is interfaced with the actuator. The pressure regulator is in fluid communication between the inlet and the outlet. The timer is interfaced with the interactive panel. The key pad is at least a portion of the interactive panel, and the interactive panel performs calculations to a value entered into the interactive panel by the key pad and a predetermined amount of fluid is dispensed at the at least one outlet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a schematic view of a measuring device having a dual flow valve in accordance with an embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
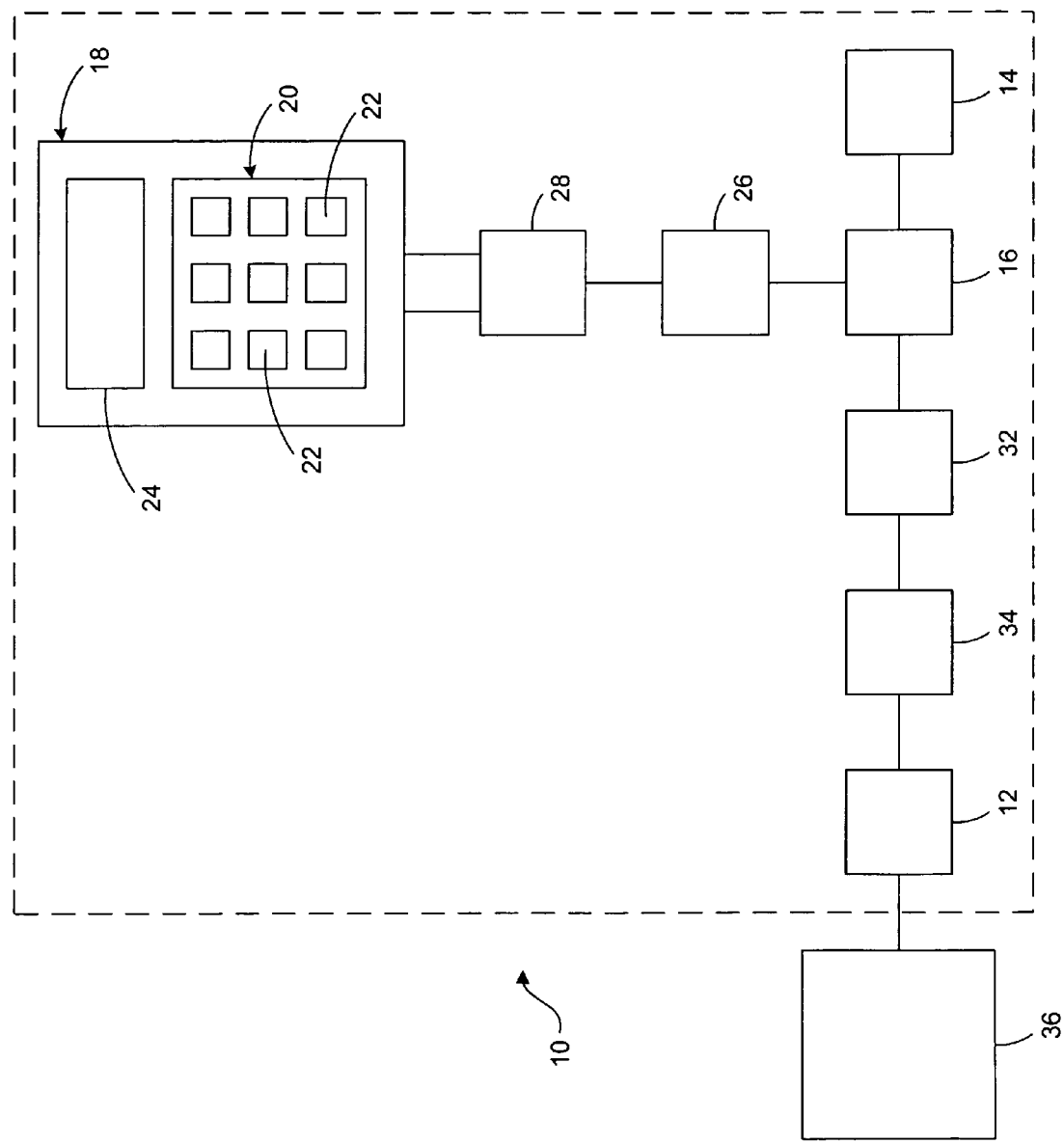
FIG. 1 is a schematic view of a measuring device in accordance with an embodiment of the present invention.
Figure 2:
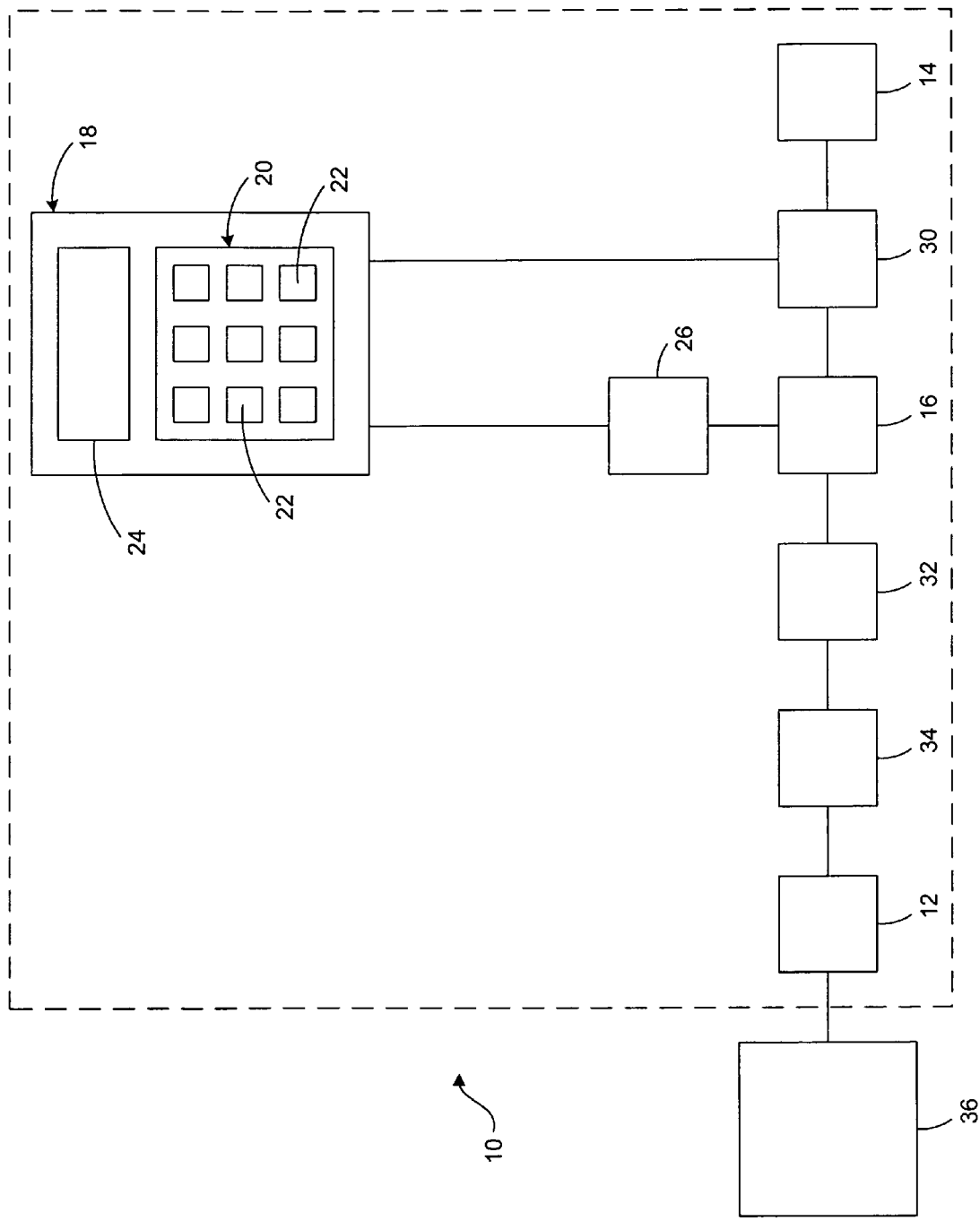
FIG. 2 is a schematic view of a measuring device having at least one sensor in accordance with an embodiment of the present invention.

Referring to FIGS. 1-3, the measuring device is generally shown at 10. The measuring device 10 has at least one inlet 12 and at least one outlet 14 in fluid communication. At least one valve 16 is in fluid communication between the inlet 12 and the outlet 14. Also, at least one interactive panel, generally indicated at 18, is interfaced with the valve 16.

A key pad generally indicated at 20, forms at least a portion of the interactive panel 18. Typically, the key pad 20 has a plurality of keys 22 which are related to numerals, characters, measuring units, or the like. The keys 22 are related to the desired characters by any suitable way, such as but not limited to, a microprocessor that receives a signal when the keys 22 are pressed to make an electrical connection in a digital circuit or the like. The interactive panel 18 can have a screen 24 which provides a visual display in response to the entry the interactive panel 18 from the key pad 20.

An actuator 26 can be operably connected to the valve 16. Typically, the interactive panel 18 is coupled or interfaced with the actuator 26. Thus, the interactive panel 18 transmits signals to the actuator 26 in order to command the actuator 26 to actuate the valve 16 in a predetermined manner, such as but not limited to, the valve 16 being placed in a fully open position or a fully closed position. It will be appreciated that the interactive panel 18 can cause the actuator 26 to actuate the valve 16 to any point between the positions.

A timer 28 can be is interfaced with the interactive panel 18, so that the interactive panel 18 transmits a signal to the actuator 26 after a predetermined period of time has expired from the timer 28. Thus, once the interactive panel 18 sends an initial signal to the actuator 26, the timer 28 determines when a predetermined period of time expires after the initial signal is transmitted from the interactive panel 18 to the actuator 26. That is, the timer 28 is used to time how long the valve 16 is opened. Once the predetermined period of time has expired, the timer 28 signals the interactive panel 18 so that the interactive panel 18 transmits a second signal to the actuator 26. Because the flow rate is known, the quantity of flow delivered is related to the time the valve 16 is open.

The timer 28 can also be used to set the time of day so that the measuring device 10 will automatically measure a predetermined amount of fluid at a particular time of the day. It will be appreciated that the timer 28 can be separate from or a part of the interactive panel 18.

Additionally, a pressure regulator 32 can be in fluid communication between the inlet 12 and the valve 16. The pressure regulator 32 regulates the pressure of the fluid flowing from the pressure regulator 32 to the outlet 14, so that the pressure of the fluid remains substantially constant between the pressure regulator 32 and the outlet 14. This results in fluid that is flowing from the pressure regulator 32 to the outlet 14 to flow at a substantially constant rate with respect to the valve 16 position. Secondly, when the valve 16 is fully open the substantially constant pressure of the fluid results in the fluid flowing at a substantially constant rate. By having the fluid flow at a substantially constant rate, the amount of fluid being dispensed from the outlet 14 can be accurately determined for any given time period.

In an alternate embodiment shown in FIG. 2, at least one measurer 30 can be between the valve 16 and the outlet 14. The measurer 30 measures the amount of fluid that has flown from the valve 16 to the outlet 14. The measurer 30 is interfaced with the interactive panel 18 so that the interactive panel 18 determines the amount of fluid flowing from the valve 16 to the outlet 14 in order to transmit signals to the actuator 26, accordingly. By way of explanation and not limitation, the measurer 30 can be any type of sensor device that measures a predetermined operating characteristic of the measuring device 10, such that the amount of fluid being dispensed from the outlet 14 can be determined based upon the operating characteristic monitored by the sensor. Alternately, the measurer 30 can be a volumetric meter that measurer the volume of flow in the measuring device 10. When the measurer 30 is used, it is unnecessary to have the timer 28 transmit and receive signals as to the time period the valve 16 is open because the amount of fluid being dispensed can be determined by the measurer 30. However, it should be appreciated that the timer 28 can be used in the measuring device 10 when the measurer 30 is being used in the measuring device 10 in order to perform other functions as described above.

With continued reference to FIGS. 1-3, a filter 34 can be in fluid communication between the inlet 12 and the valve 16. A filter 34 is used to remove debris from the fluid flowing through the measuring device 10 or for any other desirable purpose.

In another alternate embodiment shown in FIG. 3, a dual flow valve 16a can be in fluid communication with a plurality of outlets 14. The dual flow valve 16a controls a fluid to flow from the dual flow valve 16a to either or both of the multiple outlets 14. In this manner, the dual flow valve 16a can direct full fluid flow, partial fluid flow, or no fluid flow to any combination of the outlets 14.

The inlet 12 is in fluid communication with a fluid source 36. By way of explanation and not limitation, the fluid source 36 is a water source, such as but not limited to, a domestic water source in a dwelling.

With reference to FIGS. 1-3, by way of explanation and not limitation, in operation, the measuring device 10 is used for measuring predetermined amounts of fluid. Thus, the measuring device 10 can be used in a kitchen for measuring predetermined amounts of water for cooking purposes. The measuring device can be free standing or embedded in a fixture, such as but not limited to, a counter top, kitchen cabinet, or wall. The user of the measuring device 10 enters a desired amount of water into the interactive panel 18 by using the key pad 20. The key pad 20 can have keys 22 which represent numerals, characters, measuring units, or the like. After the user has entered the predetermined measuring amount, the screen 24 can show the amount entered by the user. Also, the interactive panel 18 can be used to perform calculations on any entered amount to determine a multiple of the measuring amount of the same units as entered by the user or perform calculations for unit conversions between measuring units.

Once the amount of fluid to be measured is determined, the interactive panel 18 sends a signal to the actuator 26 which alters the valve 16 to allow fluid to flow from the water source 36 to the inlet 12, through the valve 16, and ultimately dispensed from the outlet 14. The water that flows through the inlet 12 can then flow through a filter 34 and a pressure regulator 32. The pressure regulator 32 alters the pressure of the fluid flowing through the measuring device 10 so that the pressure of the fluid is at a substantially constant pressure between the pressure regulator 32 and the outlet 14. The fluid flows through the filter 34 to remove debris.

The timer 28 sends a signal to the interactive panel 18 after a predetermined period of time has expired from an initial signal transmitted from the interactive panel 18 to the actuator 26. The predetermined amount of time is based upon the measuring amount entered into the interactive panel 18. Thus, after the interactive panel 18 signals the actuator 26 to open the valve 16, the timer 28 signals the interactive panel 18 after the predetermined period of time has expired so that the interactive panel 18 will signal the actuator 26 to close the valve 16. The amount of time elapsed by the timer 28 is based upon the measuring amount. Since the fluid flowing through the measuring device 10 is at a constant pressure due to the pressure regulator 32, the amount of fluid flowing out the outlet 14 is determined by the time the valve 16 is open.

In another embodiment, the measurer 30 can be located between the valve 16 and outlet 14. The measurer 30 measures the amount of fluid flowing from the valve 16 to the outlet 14, and transmits a signal to the interactive panel 18. The interactive panel 18 then commands the actuator 26 to close the valve 16 after the interactive panel 18 determined that the desired measuring amount of fluid has flown past the measurer 30 based upon the measurer's 30 measurements. Typically, the timer 28 does not receive or transmit signals as to the valve 16 being actuated in order to determine the flow through the measuring device 10 in this embodiment, since the measurer 30 is being used, but the timer 28 can be used for other desirable purposes.

In another embodiment, the measuring device 10 has a dual flow valve 16a that is connected to a plurality of outlets 14. Thus, the fluid flows through any predetermined number of outlets 14 depending upon which part of the dual flow valve 16a is open. As described above, the dual flow valve 16a is interfaced with the interactive panel 18 such that the interactive panel 10 is interfaced with the actuator 26 and the actuator 26 moves the dual flow valve 16a accordingly.

Further examples of the measuring device 10 in operation are, but not limited to, integrating the measuring device 10 in a refrigerator (not shown). Thus, the measuring device 10 can function similar to an ice and water dispenser in the refrigerator, except that the functions described above for measuring the amount of water dispensed from the measuring device 10 would be included. A user could use the interactive panel 18 on the refrigerator which would then dispense the accurate desired amount of water.

Another example of the measuring device 10 in operation is to integrate the measuring device 10 with a coffee maker (not shown). Thus, the timer 28 can be set to dispense a predetermined measured amount of water at a predetermined time into the coffee maker. The desired measured amount of water is then dispensed from the measuring device into the coffee maker so that the coffee maker can brew the coffee. It should be appreciated that the above examples are by way of explanation and not limitation as to the function of the measuring device 10, and it is within the scope of the present invention for the measuring device to function independently or integrated with other devices.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A measuring device located in a kitchen for measuring predetermined amounts of fluid for cooking purposes, comprising:

at least one inlet in fluid communication with a domestic fluid source;

at least one outlet in fluid communication with said at least one inlet, said at least one outlet for dispensing said fluid for cooking purposes;

at least one valve in fluid communication between said at least one inlet and said at least one outlet;

a pressure regulator located upstream of said at least one valve and in fluid communication between said at least one inlet and said at least one outlet, said pressure regulator regulates the pressure of fluid flowing from said at least one inlet to said at least one outlet independently of the pressure of fluid flowing into said inlet from said domestic fluid source, to control a flow rate of fluid;

an interactive panel to receive a value from a user, and interfaced with and to control said at least one valve in order to dispense an amount of fluid correlated to said received value to be dispensed from said at least one outlet; and said interactive panel further comprising a key pad to facilitate a user entering said value;

said interactive panel further comprising a screen to conveniently display information to a user;

said interactive panel further comprises an actuator, said actuator actuates said valve;

said interactive panel performs measuring unit conversions and multiplies the entered value calculations to a value entered into said interactive panel by means of said key pad, displays the results on said screen, and calculates the necessary length of time said actuator will activate the valve based upon the programmed setting of the pressure regulator and the desired amount of dispensation based upon the received value, and controls the actuation of said actuator;

a timer interfaced with said interactive panel, wherein said amount of fluid dispensed is substantially equal to said received value, by means of said timer determining when a predetermined period of time expires depending upon said flow rate of fluid as controlled by said pressure regulator;

said timer is programmed to automatically actuate the actuator for a programmed period of time to dispense a pre-set amount of fluid at a pre-selected time of day, wherein said measuring device is located upon and is small enough to fit upon a kitchen countertop.

2. A measuring device located in a kitchen for measuring predetermined amounts of fluid for cooking purposes, comprising:

at least one inlet in fluid communication with a domestic fluid source;

at least one outlet in fluid communication with said at least one inlet, said at least one outlet for dispensing said fluid for cooking purposes;

at least one valve in fluid communication between said at least one inlet and said at least one outlet;

a pressure regulator located upstream of said at least one valve and in fluid communication between said at least one inlet and said at least one outlet, said pressure regulator regulates the pressure of fluid flowing from said at least one inlet to said at least one outlet independently of the pressure of fluid flowing into said at least one inlet from said domestic fluid source, to control a flow rate of fluid;

a measurer located between said at least one valve and the at least one outlet;

an interactive panel to receive a value from a user, and interfaced with and to control said at least one valve in order to dispense an amount of fluid correlated to said received value to be dispensed from said at least one outlet; and said interactive panel further comprising a key pad to facilitate a user entering said value;

said interactive panel further comprising a screen to conveniently display information to a user;

said interactive panel further comprises an actuator, said actuator actuates said valve;

said measurer communicates to said interactive panel the measured actual rate of flow of said fluid to the said at least one outlet, said interactive panel performs measuring unit conversions and multiplies the entered value calculations to a value entered into said interactive panel by means of said key pad, displays the results on said screen, and calculates the total amount of flow of said fluid dispensed to the at least one outlet based upon the communication from said measurer in order to determine when to open or close said at least one valve based upon the desired amount of dispensation according to the received value, and controls the actuation of said actuator to either open or close accordingly, a timer interfaced with said interactive panel, said timer is programmed to automatically initiate said interactive panel to dispense a pre-set amount of fluid at a pre-selected time of day, wherein said measuring device is located upon and is small enough to fit upon a kitchen countertop.

* * * * *